(No Model.)

N. STRACK.
COVERED BAKE PAN.

No. 589,229. Patented Aug. 31, 1897.

Witnesses.
Geo. W. Truny
B. C. Roloff

Inventor:
Nicholas Strack
By H. G. Underwood
Norweg

THE NORRIS PETERS CO., PHOTO-LITHO., WASHINGTON, D. C.

United States Patent Office.

NICKOLAS STRACK, OF OCONTO, WISCONSIN.

COVERED BAKE-PAN.

SPECIFICATION forming part of Letters Patent No. 589,229, dated August 31, 1897.

Application filed May 29, 1897. Serial No. 638,734. No model.

*To all whom it may concern:*

Be it known that I, NICKOLAS STRACK, a citizen of the United States, and a resident of Oconto, in the county of Oconto and State of Wisconsin, have invented certain new and useful Improvements in Covered Bake-Pans; and I do hereby declare that the following is a full, clear, and exact description thereof.

My invention has especial reference to bake-pans such as are used in hotel and restaurant kitchens where meat or other material to be cooked has to be prepared and made ready for baking in its turn, and where it is ordinarily especially liable to the intrusion of bugs, flies, and other insects before it is placed in the oven; and it consists in certain peculiarities of construction and combination of parts, as will be fully set forth hereinafter and subsequently claimed.

Figure 1:
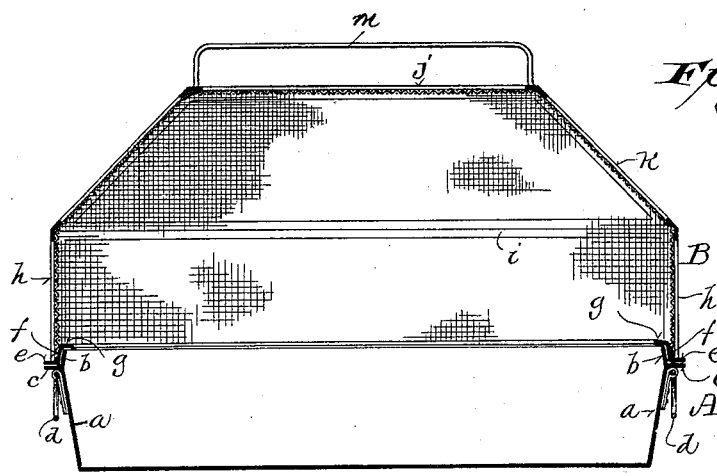
Figure 2:
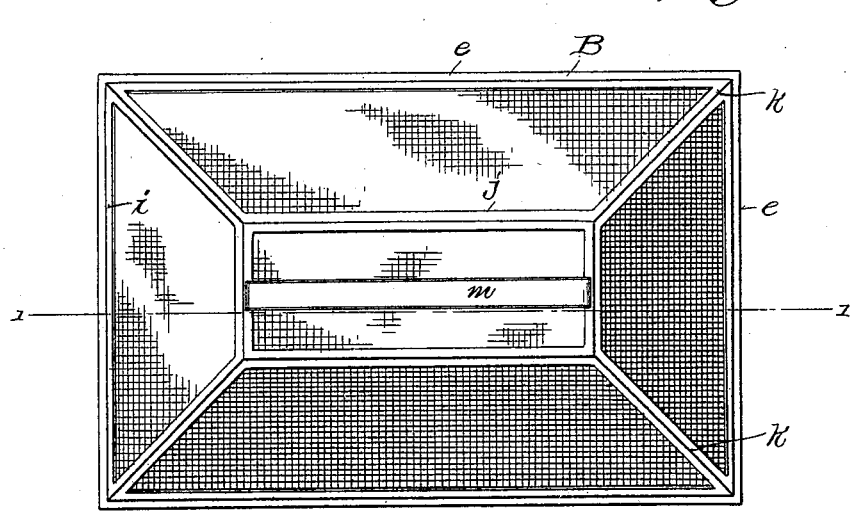

In the drawings, Figure 1 is a vertical longitudinal sectional view of my improved device, taken on the line 1 1 of Fig. 2. Fig. 2 is a plan view thereof.

Referring to the drawings, A represents the pan and B its cover. The pan is made of sheet metal, with a horizontal bottom and outward-flaring sides and ends $a\ a$, the upper portions of which incline or flare inwardly, as shown at $b\ b$, there being an exterior horizontal projecting flange $c$ extending all around the pan on the line of juncture of the oppositely-inclined portions $a\ b$ of said pan sides and ends. The said pan is further conveniently supplied with handles $d\ d$ at the ends thereof.

The cover B is formed of a metallic skeleton frame covered with fine wire-gauze, the gauze, except at the base, being on the inside of the said metal frame for the better protection of said covering. The base of the cover is continuous and formed with an outward-projecting lower horizontal flange $e$, adapted to rest on the pan-flange $c$, an oblique central portion $f$, adapted to fit snugly against the part $b$ of the pan sides and ends, and an inward-projecting upper horizontal flange $g$, adapted to rest on and project inwardly beyond the top edge of said part $b$ of the pan. The lower edge of the wire-gauze covering is secured to the oblique portion $f$ of the said cover-base, and metallic angle-pieces $h\ h$ project up from each corner and are united to a continuous horizontal band $i$, the same being a like metallic angle-strip, and there being another continuous horizontal band or angle-strip $j$ of less size at the top of the cover, the said continuous bands $i\ j$ being united by the oblique corner-pieces $k\ k$, also formed of metallic angle-strips, while a handle $m$, formed of a straight metallic strip with bent ends, rises from the end portions of the upper horizontal band $j$. This described skeleton frame not only stiffens and strengthens the wire-gauze covering, but guards the same from injury.

When the cover is upon the pan, the contents can always be plainly seen, and yet by reason of the described construction of the pan-flanges and cover-base it will be impossible for anything that creeps, crawls, or flies to have access to the said contents either before or after baking.

Having thus described my invention, what I claim as new, and desire to secure by Letters Patent, is—

A sheet-metal bake-pan comprising a suitable vessel having a continuous exterior horizontal flange, and an inwardly-flaring upper edge above said flange, in combination with a cover formed of a skeleton metallic frame covered with foraminous material, and having a base formed of a continuous metallic strip provided with an upper inwardly-inclined flange resting on and projecting inwardly beyond the said inwardly-flaring upper edge of the pan, a lower outwardly-inclined flange resting on the exterior horizontal flange of the pan, and an oblique central portion fitting snugly against the said inwardly-flaring upper edge of the pan, substantially as set forth.

In testimony that I claim the foregoing I have hereunto set my hand, at Oconto, in the county of Oconto and State of Wisconsin, in the presence of two witnesses.

NICKOLAS STRACK.

Witnesses:
OTTO C. KNELL,
CHAS. L. HALL.